(12) United States Patent
Düll et al.

(10) Patent No.: US 11,365,780 B2
(45) Date of Patent: Jun. 21, 2022

(54) SPACER FOR A FASTENING ARRANGEMENT, FASTENING ARRANGEMENT WITH SUCH A SPACER AND METHOD FOR FASTENING A MOUNTING PART TO A CARRIER PART

(71) Applicant: ILLINOIS TOOL WORKS INC., Glenview, IL (US)

(72) Inventors: Florian Düll, Röttingen (DE); Albert Sbongk, Niederstetten (DE); Torsten Klein, Kaiserslautern (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 44 days.

(21) Appl. No.: 16/868,617

(22) Filed: May 7, 2020

(65) Prior Publication Data
US 2020/0355238 A1 Nov. 12, 2020

(30) Foreign Application Priority Data

May 10, 2019 (EP) ..................................... 19173895
May 22, 2019 (DE) ..................... 10 2019 113 663.6

(51) Int. Cl.
*F16F 1/36* (2006.01)
*F16F 1/37* (2006.01)
(Continued)

(52) U.S. Cl.
CPC ............ *F16F 7/128* (2013.01); *F16F 1/3605* (2013.01); *F16F 1/376* (2013.01); *F16F 1/3735* (2013.01);
(Continued)

(58) Field of Classification Search
CPC .. F16F 1/38; F16F 1/3735; F16F 1/373; F16F 1/3732; F16F 1/3605; F16F 1/376; F16F 1/3835
See application file for complete search history.

(56) References Cited

U.S. PATENT DOCUMENTS 2,386,463 A * 10/1945 Hile ...................... F16F 3/0873
267/140.5
3,042,394 A * 7/1962 Bliss ........................ B60G 7/02
267/269
(Continued)

FOREIGN PATENT DOCUMENTS

CN 207333397 U 5/2018
DE 19500975 A1 * 7/1995 ................ B60S 1/34
(Continued)

*Primary Examiner* — Thomas J Williams
(74) *Attorney, Agent, or Firm* — Thompson Hine LLP

(57) ABSTRACT

A spacer (1) for vibration-damped fastening of a mounting part (2) to a carrier part (3), wherein the spacer has a base body (4) with a first flange region (5) and a second flange region (6) which is opposite viewed in the longitudinal direction (L) of the base body and with a passage (7) in which a fastener (8) which is connected to the carrier part, can be received at least sectionally. The base body has an at least two-part design with a first body part (9) and at least a further, second body part (10), wherein the body parts can be detachable connected to one another to create the base body and wherein, in the connected state, a gap region (11) is provided between the first and second flange region, by which the border of a fastening hole (18) configured in the mounting part can be received.

14 Claims, 5 Drawing Sheets

(51) Int. Cl.
*F16F 7/12* (2006.01)
*F16F 1/373* (2006.01)
*F16F 1/376* (2006.01)
*H04R 1/02* (2006.01)

(52) U.S. Cl.
CPC ..... *F16F 1/3732* (2013.01); *F16F 2230/0005* (2013.01); *F16F 2238/04* (2013.01); *H04R 1/025* (2013.01)

(56) References Cited

U.S. PATENT DOCUMENTS

| | | | | |
|---|---|---|---|---|
| 4,033,533 A * | 7/1977 | Evrard | ....................... | F16F 1/36 |
| | | | | 248/632 |
| 4,286,777 A * | 9/1981 | Brown | ................ | B60G 99/004 |
| | | | | 267/294 |
| 5,295,252 A | 3/1994 | Torii | | |
| 5,295,652 A | 3/1994 | Byrne | | |
| 5,799,930 A * | 9/1998 | Willett | ................... | B62D 24/02 |
| | | | | 267/141.4 |
| 2018/0297673 A1 | 10/2018 | More | | |

FOREIGN PATENT DOCUMENTS

| | | | |
|---|---|---|---|
| DE | 102005010433 | 9/2006 | |
| DE | 102006052213 | 5/2008 | |
| EP | 0899476 A1 * | 3/1999 | ............ F16F 1/3732 |
| EP | 2499059 | 9/2012 | |
| EP | 3499059 A1 | 6/2019 | |
| WO | WO 2011057555 | 5/2011 | |

\* cited by examiner

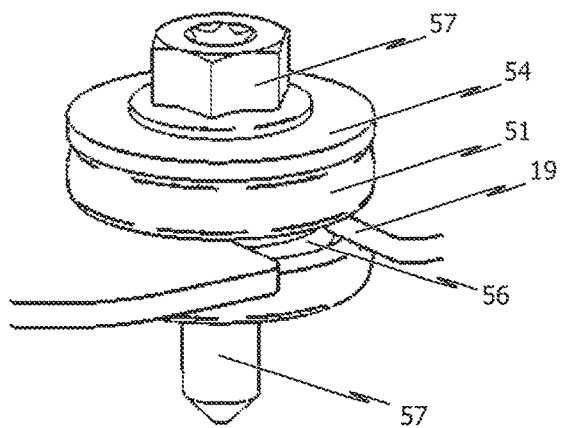
FIG. 1 (PRIOR ART)
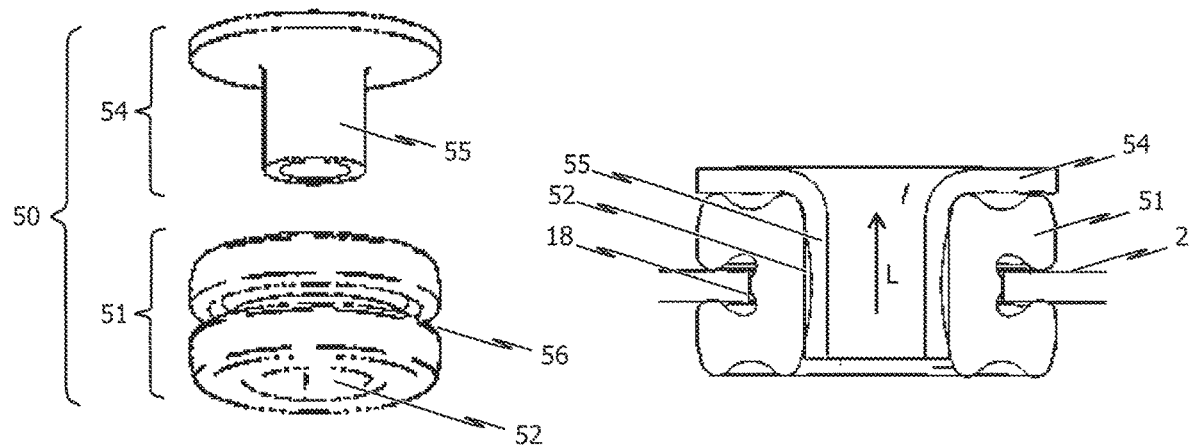
FIG. 2
(PRIOR ART)
FIG. 3
(PRIOR ART)

SPACER FOR A FASTENING ARRANGEMENT, FASTENING ARRANGEMENT WITH SUCH A SPACER AND METHOD FOR FASTENING A MOUNTING PART TO A CARRIER PART

TECHNICAL FIELD

The present invention relates generally to devices for fastening or securing component parts or machine parts together and to corresponding fastening methods.

Specifically, the invention relates in particular to an improved fastening system with vibration compensation and to components of such a fastening system.

A possible field of application of the invention is automotive engineering. One application is for example the fastening of a loudspeaker to a substrate, wherein the loudspeaker has to be decoupled. Another application is the fastening of a control unit.

BACKGROUND

Mounting parts, for example loudspeakers, control units or the like, are frequently provided with fastening holes, with which they are able to be fastened via screws to a counterpart, in particular a carrier part, for instance a carrier substrate.

In many cases, it is desired for the mounting parts to be fixed in a vibration-damped manner. In these cases, use is usually made of sleeve-shaped spacers made from an elastic, rubber-like material, for example an ethylene propylene diene rubber (EPDM). The spacer has the purpose of distancing the screw, or generally a mounting bolt, from the mounting part, for example a loudspeaker, such that there is no direct contact between the mounting bolt and mounting part and also the carrier part, for example carrier substrate.

The spacer serves not only for this distancing but in particular also for avoiding vibration transfer between the connected-together parts, with the result that mutual vibrational influence does not occur or is at least minimized and noise generation is suppressed.

A fastening arrangement of this kind that is well known from the prior art is shown schematically and in an isometric view in FIG. 1, while FIG. 2 likewise shows, in a schematic and isometric view, the spacer 50 used in the fastening arrangement according to FIG. 1 in an exploded illustration. FIG. 3 shows a sectional view of the spacer 50 in a state in which it is fastened to a mounting part 2.

The fastening arrangement serves for the vibration-damped fastening of a mounting part 2 to a carrier part and to this end has a spacer 50 with a ring-shaped or sleeve-shaped base body 51 made from an elastic, rubber-like material. The base body 51 is provided with a passage bore 52 running along its longitudinal axis L, in which the shaft region 55 of a mounting sleeve 54 is received. The mounting sleeve 54 itself is manufactured, in the conventional fastening arrangement shown in FIG. 1 to FIG. 3, from metal, in particular aluminum.

The ring-shaped or sleeve-shaped base body 51 of the spacer 50 is provided with a circumferential gap region 56 (annular gap), in which or by which the border (peripheral region) of a fastening hole 18 configured in the mounting part 2 is received sectionally.

In order to fasten the spacer 50 to the mounting part 2, it is pushed into the open slot 18, 19. Subsequently, a screw 57 is introduced into the mounting sleeve 54 and screwed together with a carrier part not explicitly shown in FIG. 1.

In order that the fixing pressure exerted by the screw head of the screw 57 can be transmitted to the carrier part with which the mounting part 2 is to be connected, the above-mentioned mounting sleeve 54 is provided. In the mounted state, the mounting sleeve 54 passes through the passage hole 52 in the elastic base body 51 of the spacer 50 and for its part—as already stated—has the shaft 55 of the mounting screw 57 passing through it.

The mounting of the spacer 50 consisting of the elastic base body 51 and the mounting sleeve 54 in the fastening hole 18 of the mounting part 2 is not without problems, no matter whether the elastic base body 51 has first of all been introduced into its intended position in the fastening hole 18 before the mounting sleeve 54 is plugged in, or whether the base body 51 is introduced in the state positioned on the mounting sleeve 54. The reason for this is, inter alia, that on account of the elasticity of the ring-shaped or sleeve-shaped base body 51, the spacer 50 tends, upon being pushed into the fastening hole 18, to be compressed or deformed in some other way, there being the risk of the spacer 50 under certain circumstances being mounted incorrectly in the fastening hole of the mounting part 2, and this can have an effect on the firmness of fixing of the mounting part 2 to the carrier part.

Furthermore, the mounting of the spacer 50 in the fastening hole 18 configured in the mounting part 2 requires this fastening hole 18 to be open towards the outside and to provide an introduction slot 19 for the spacer 50. Therefore, the connection between the spacer 50 and the mounting part 2 is weakened. There is also in principle the risk of the spacer 50, in a premounted state, sliding back out of the fastening hole 18 in the mounting part 2 or no longer being fastened properly in the fastening hole 18 in the mounting part 2.

SUMMARY

Proceeding therefrom, the invention is based on the object of creating an optimized fastening system for fastening a mounting part to a carrier part, which improves the security of captive premounting, favours mounting and is usable both for decoupling and for hard screwdriving.

Accordingly the invention relates in particular to a spacer for a fastening arrangement for the particularly vibration-damped fastening of a mounting part to a carrier part, wherein the spacer has a particularly ring-shaped or sleeve-shaped base body with a first flange region and a second flange region which is opposite viewed in the longitudinal direction of the base body and also with a passage running particularly parallel to the longitudinal direction. In the passage, a fastener which is connected, or to be connected, to the carrier part, in particular a screw shaft of a fastening screw, can be received at least sectionally.

The invention provides in particular that the base body has an at least two-part design and comprises a first body part and at least a further, second body part, wherein these body parts can be connected to one another, in particular detachably, to create the base body. In the connected state of the body parts, i.e. when the actual base body of the spacer has been formed, a particularly at least substantially ring-shaped gap region is provided between the first and second flange region of the base body, in or by which the border of a fastening hole configured in the mounting part can be received at least sectionally.

As a result of the multi-part design of the base body of the spacer, substantial advantages—compared with conventional spacers—are possible in particular in the premounting of the spacer on the mounting part. Firstly, the spacer according to the invention can also be premounted in fastening holes of the mounting part which are provided without a corresponding introduction slot for introducing the spacer. Rather, the multi-part design of the base body allows the first body part of the base body of the spacer to be placed on the fastening hole of the mounting part from a first side and the second body part of the base body of the spacer to be placed on the fastening hole of the mounting part from a second side and subsequently the body parts to be connected together, such that a shaft region connecting the first and second flange region of the spacer runs through the fastening hole in the mounting part. This ensures that in a state when, with the help of a fastener (in particular fastening screw) running through the passage of the spacer, the mounting part is connected via the spacer to the carrier part, the force transmitted to the spacer via the fastener is introduced uniformly into the entire circumferential region of the fastening hole. In this way, secure and uniform fixing or fastening of the mounting part to the carrier part can be realized. In particular, the spacer can be supported fully on the circumferential region of the fastening hole in the mounting part.

Furthermore, the two-part or multi-part configuration of the base body allows captive premounting of the spacer on the mounting part.

The spacer is suitable both for hard screwdriving and for elastically decoupled screwing. Manufacturing and thermal tolerances can be compensated by a clearance between the at least substantially ring-shaped gap region of the base body and the fastening hole configured in the mounting part.

Furthermore, the entire spacer can be formed from plastic, in particular with the help of a multi-component injection-moulding process.

In order to allow elastic decoupling and thus vibration-damped fastening of the mounting part to the carrier part, according to embodiments of the spacer according to the invention, at least the first and second flange regions of the base body are formed from a first plastics component, while a surface at least sectionally delimiting the gap region is formed from a second plastics component which is softer by comparison with the first plastics component.

According to realizations of the spacer according to the invention, the first flange region has a surface pointing in the direction of the second flange region, at least in the connected state of the body parts, which is in particular at least substantially ring-shaped, which surface delimits the gap region in the direction of the first flange region in the connected state of the body parts. Furthermore, the second flange region has a surface pointing in the direction of the first flange region, at least in the connected state of the body parts, which is in particular at least substantially ring-shaped, which surface delimits the gap region in the direction of the second flange region in the connected state of the body parts.

In this realization of the spacer according to the invention, it is conceivable for the surface of the first flange region pointing in the direction of the second flange region, at least in the connected state of the body parts, and/or the surface of the second flange region pointing in the direction of the first flange region, at least in the connected state of the body parts, to be provided at least sectionally with toothing or with regions projecting correspondingly from the surface. The toothing or the correspondingly projecting regions can be formed at least in part or sectionally from a plastics component which is softer than the plastics component from which the first and second flange region of the spacer are formed, in order for it to be possible to realize vibration-damped fastening of the mounting part to the carrier part that is as optimal as possible.

According to embodiments of the spacer according to the invention, the base body of the spacer, at least in the connected state of the body parts, has a shaft region connecting the first flange region to the second flange region and surrounding the passage through the spacer or through the base body at least sectionally, the diameter of said shaft region being smaller than the diameter of the first and second flange region. In this embodiment, it is conceivable for the outer surface of the shaft region to delimit the gap region at least sectionally in a radial direction—in respect of the longitudinal direction of the base body. The outer surface of the shaft region can be formed at least sectionally from a plastics component which is softer than the plastics component from which the first and second flange region of the base body are formed.

According to realizations of the last-mentioned embodiments of the spacer, the outer surface of the shaft region is provided with toothing or regions correspondingly projecting radially from the outer surface. The toothing or the correspondingly projecting regions can be formed at least in part or sectionally from a plastics component which is softer than the plastics component from which the first and second flange region are formed.

In order to form the base body, the body parts of the base body can be preferably detachably connectable to one another particularly via a plug-in connection. To this end, the first body part can comprise at least one first plug-in connection part configured as a receiving plug-in part or a plug-in part to be received and the at least one second body part of the base body can comprise at least one second plug-in connection part designed accordingly in a complementary manner thereto. However, the invention is not limited to spacers in which the body parts of the base body can be connected particularly detachably via a plug-in connection. For example, an adhesive bond between the body parts of the base body or a screw connection would also be conceivable in principle.

In order to keep the manufacturing costs of the spacer as low as possible, the latter is configured as an at least two-component injection-moulded plastics part, wherein a first plastics component forms in particular the flange regions and the passage of the spacer, and wherein the second plastics component is softer than the first plastics component and forms the at least substantially ring-shaped gap region in the base body at least sectionally.

In particular, according to preferred realizations of the spacer according to the invention, the base body has a two-part structure as a whole and comprises a first body part and a second body part identical thereto, wherein in order to form the base body the first body part and the second body part designed identically thereto can be connected to one another, preferably detachably.

The invention also relates to a fastening arrangement for the particularly vibration-damped fastening of a mounting part to a carrier part, wherein the fastening arrangement comprises a spacer of the abovementioned type according to the invention. The border of a fastening hole configured in the mounting part can be received by the gap region of the spacer at least sectionally. The fastening arrangement also comprises a fastener, which is embodied for example in the form of a fastening screw and is particularly detachably connected or connectable to the carrier part.

The fastener (fastening screw) has a head region, the diameter of which is greater than the diameter of the passage running through the base body of the spacer. The fastener also comprises a shaft region, the diameter of which is smaller than the diameter of the passage running through the base body of the spacer, wherein the shaft region of the fastener is received or receivable at least sectionally by the passage in the spacer.

An end region of the shaft region opposite the head region of the fastener is connected or connectable, particularly in a force-fit and/or form-fit manner, to the carrier part. To this end, it is conceivable for at least the end region of the shaft region opposite the head region of the fastener to be provided with a corresponding screw thread, although the invention is not limited to screw connections.

According to embodiments of the fastening arrangement according to the invention, said fastening arrangement further comprises a fastening sleeve received or receivable in an opening, in particular a bore, in the carrier part, by which the end region, in particular, of the shaft region of the fastener is received or receivable at least sectionally in particular in a force-fit and/or form-fit manner.

In respect of the fastening method according to the invention, a fastening arrangement of the abovementioned type according to the invention is provided. Furthermore, a fastening hole is formed in the mounting part, wherein the fastening hole preferably comprises a continuous, i.e. uninterrupted, border.

Subsequently, the spacer of the fastening arrangement is mounted on the mounting part, namely in that the first body part of the base body of the spacer is placed on the fastening hole in the mounting part from a first side and the second body part of the base body of the spacer is placed on the fastening hole in the mounting part from an opposite second side and the body parts are subsequently connected to one another.

After the body parts of the base body have been connected, a shaft region connecting the first and second flange region of the spacer runs through the fastening hole.

Subsequently, the fastener of the fastening arrangement is guided through the passage of the spacer and connected to the carrier part.

BRIEF DESCRIPTION OF THE DRAWINGS

In the following text, an exemplary embodiment of the fastening arrangement according to the invention is described in more detail with reference to the accompanying drawings.

In the drawings:

FIG. 1 schematically shows an isometric view of a conventional fastening arrangement, well known from the prior art, for the vibration-damped fastening of a mounting part to a carrier part, wherein FIG. 1 shows the fastening arrangement in a mounted state;

FIG. 2 schematically shows an isometric exploded illustration of a spacer used in the fastening arrangement according to FIG. 1;

FIG. 3 schematically shows a sectional view of the spacer according to FIG. 2 in a state premounted on the mounting part;

DETAILED DESCRIPTION

Figure 4:
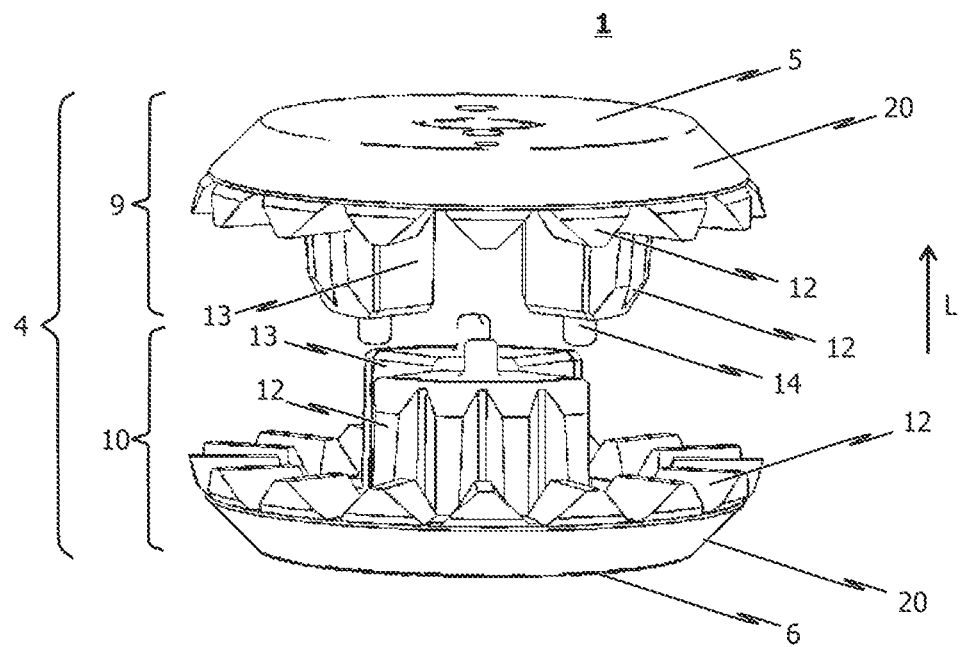
FIG. 4 schematically shows an isometric exploded illustration of a first exemplary embodiment of the spacer according to the invention for a fastening arrangement for the particularly vibration-damped fastening of a mounting part to a carrier part, wherein in FIG. 4 the two body parts forming the base body of the spacer have not been connected to one another yet.
Figure 5:
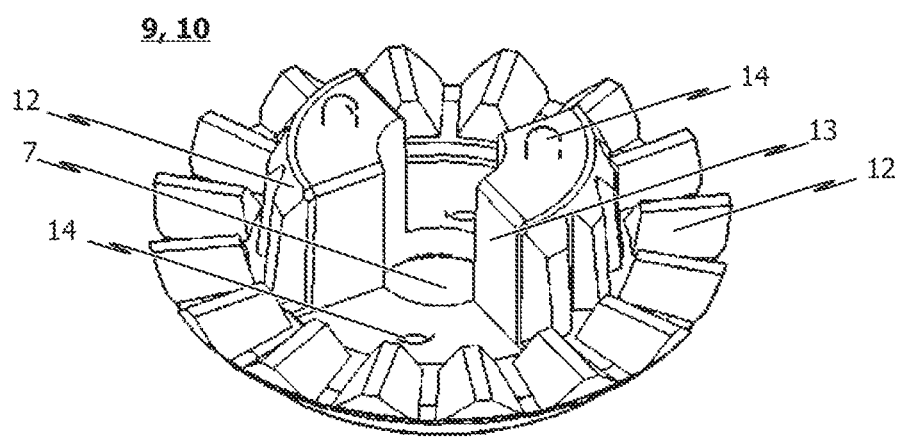
FIG. 5 schematically shows an isometric view of a first body part of the base body of the spacer according to FIG. 4.
Figure 6:
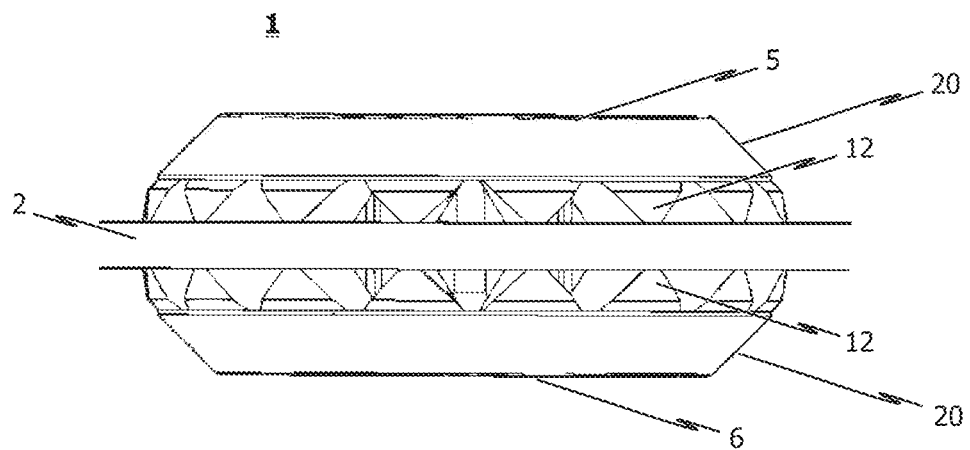
FIG. 6 shows the spacer according to FIG. 4 in a state in which the body parts for forming the base body of the spacer are connected to one another, wherein in FIG. 6 the spacer is shown in its state premounted on the mounting part.

FIG. 1 schematically illustrates an isometric view of a fastening arrangement, well known from the prior art, for the particularly vibration-damped fastening of a mounting part 2 to a carrier part, not shown in FIG. 1. FIG. 2 shows a schematic and isometric exploded illustration of a spacer 50 used in the fastening arrangement according to FIG. 1, while FIG. 3 shows a schematic sectional view of the spacer 50 according to FIG. 2 in a state premounted on the mounting part 2.

The spacer 50 used in the conventional fastening arrangement comprises a ring-shaped or sleeve-shaped base body 51 made from an elastic, rubber-like material, in particular ethylene propylene diene rubber, and has the objective of distancing a fastening screw 57, or generally a mounting bolt, from the mounting part 2 such that there is no direct contact between the mounting bolt 57 and mounting part 2 and also the carrier part.

The ring-shaped or sleeve-shaped base body 51 made from the elastic, rubber-like material is provided with a passage bore 52 running along its longitudinal axis L. As can be gathered in particular from the sectional illustration in FIG. 3, the shaft region 55 of a mounting sleeve 54 formed from a metal is received at least sectionally in the passage 52 formed in the base body 51.

Formed at one end region of the shaft 55 of the mounting sleeve 54 is a flange region, which has a diameter which is in particular much greater than the diameter of the passage 52 formed in the ring-shaped or sleeve-shaped base body 51.

In particular, in the fastening arrangement that is shown in FIG. 1 to FIG. 3 and is well known from the prior art, the diameter of the flange region of the mounting sleeve 54 corresponds approximately to the diameter of the ring-shaped or sleeve-shaped base body 51 made from the elastic, rubber-like material.

The ring-shaped or sleeve-shaped base body 51 of the spacer 50 is provided with a circumferential gap region 56 (annular gap), in which or by which the border of a fastening hole 19 configured in the mounting part 2 is received at least sectionally.

Specifically, the design of the spacer 50 of the conventional fastening arrangement requires that the spacer 50 can be inserted only into an open fastening hole 18 of the mounting part 2, i.e. into a fastening hole 18 with an introduction slot 19. As a result, there is the risk, inter alia, of the premounted spacer 50 sliding out of the fastening hole 18 of the mounting part 2 again before a mounting bolt 57 is guided through the mounting sleeve 54 and fixed to the carrier part.

In the following text, with reference to the illustrations in FIG. 4 to FIG. 10, exemplary embodiments of the fastening arrangement according to the invention and components thereof, in particular the spacer 1, are described in more detail.

The spacer 1 of the fastening arrangement according to the invention consists of a hard plastics material and a softer plastics material, wherein these two plastics materials have preferably been processed in a two-component injection-moulding process. In particular, in the spacer 1 according to the present invention, it is possible to dispense with a mounting sleeve formed for example from metal.

The spacer 1 is embodied as a ring-shaped or sleeve-shaped base body 4, which comprises a first flange region 5 made from the abovementioned hard plastics material, and a second flange region 6 which is opposite viewed in the longitudinal direction L of the spacer 1 and is likewise made from the hard plastics material. Formed between the first and second flange region 5, 6 of the spacer 1 is a passage 7 running in particular parallel to the longitudinal direction L of the spacer 1, in which a fastener 8 connected, or to be connected, to a carrier part 3, in particular a mounting screw or a screw shaft of a mounting screw, can be received at least sectionally.

The spacer 1 is designed in a multipart manner. Specifically, in the embodiments shown in FIG. 4 to FIG. 10, the spacer 1 is designed in exactly two parts and consists of a first body part 9 and a further, second body part 10, wherein these two body parts 9, 10 are particularly detachably connectable to one another to form the base body 4 of the spacer 1 or to form the spacer 1.

In the exemplary embodiments of the present invention shown in the drawings, the spacer 1, or the base body 4 of the spacer 1, is formed by two identically designed body parts 9, 10, wherein to form the spacer 1 these two body parts 9, 10 designed identically to one another are preferably detachably connectable to one another.

As a result of this multipart design of the spacer 1, the latter can be premounted in a fastening hole 18 configured in the mounting part 2, wherein this arrangement allows the spacer 1 to be premounted without an additional lateral opening that is connected to the fastening hole 18 of the mounting part 2. In contrast to the conventional fastening arrangement, shown for example in FIG. 1 to FIG. 3, in which, to premount the spacer 1, the latter has to be introduced laterally into a fastening hole 18 of the mounting part 2 and thus requires a corresponding slot opening in the mounting part 2, with the solution according to the invention any weakening at the fastening hole 18 can be prevented effectively. Furthermore, the premounting of the spacer 1 is more robust and it is ensured that the spacer 1 can no longer slide out of the fastening hole 18 of the mounting part 2.

In the connected state of the body parts 9, 10 which are preferably designed identically to one another, i.e. in a state in which the spacer 1 has been formed, a particularly at least substantially ring-shaped gap region 11 is provided between the first and second flange region 5, 6 of the spacer 1, or of the base body 4 of the spacer 1, in or by which the border of a fastening hole configured in the mounting part 2 can be received at least sectionally.

In order to improve the robustness in the mounting of the spacer 1, or the robustness in the premounted state of the spacer 1 on the mounting part 2, the body parts 9, 10 of the spacer 1 are provided with fixing pins (plug-in connection part 14), via which the body parts 9, 10 can be connected firmly to one another.

For example, it is conceivable in this connection that, in order to form the base body 4 of the spacer 1, the body parts 9, 10 are particularly detachably connectable to one another via a plug-in connection, wherein, to this end, the first body part 9 comprises at least one first plug-in connection part 14 configured as a receiving plug-in part or a plug-in part to be received and the at least one second body part 10 comprises at least one second plug-in connection part 14 designed accordingly in a complementary manner thereto.

A further increase in the robustness in the mounting, or the robustness in the premounted state, of the spacer 1 resides in the fact that preferably the first and second flange region 5, 6 of the spacer 1 are configured as hard plastics components and serve to cover at least the majority of the soft plastics component provided for damping. In particular, in the embodiments of the spacer 1 according to the invention that are shown in the drawings, the first and second flange region 5, 6 are provided with a mounting ramp 20, i.e. the outer edge surrounding the flange region 5, 6 is bevelled. As a result, adhesive contact with the soft plastics component, which can result in deformations and/or slipping of the parts of the spacer 1, or of the spacer 1 itself, is avoided.

The soft plastics component of the spacer 1, and in particular the shape thereof, is preferably designed such that it supports the material softness with its decoupling/damping characteristic. For example, the soft plastics components can be present at least sectionally in the form of spikes or teeth (or projecting regions/toothing 12).

Preferably, at the outer edge, the soft plastics components prolong the mounting ramp 20 of the first and second flange region 5, 6 in the form of spikes. Alternatively, these could also be prolonged tips of hard plastics components, when increased robustness is necessary. In this connection, reference is made to the embodiment of the spacer 1 schematically illustrated in FIG. 9 and FIG. 10.

In the exemplary embodiments of the spacer 1 according to the invention that are shown in the drawings, the first and second flange region 5, 6 of the spacer 1 are formed from a first plastics component, wherein a surface of the spacer 1 that borders the gap region 11 is formed from a second plastics component which is softer by comparison with the first plastics component.

Furthermore, in the exemplary embodiments, the first flange region 5 has a surface pointing in the direction of the second flange region 6, at least in the connected state of the two body parts 9, 10, which is in particular at least substantially ring-shaped, which surface delimits the gap region 11 in the direction of the first flange region 5 in the connected state of the body parts 9, 10. Furthermore, the second flange region 6 has a surface pointing in the direction of the first flange region 5, at least in the connected state of the body parts 9, 10, which is in particular at least substantially ring-shaped, which surface delimits the gap region 11 in the direction of the second flange region 6 in the connected state of the body parts 9, 10. The surface of the first flange region 5 pointing in the direction of the second flange region 6, at least in the connected state of the body parts 9, 10, and the surface of the second flange region 6 pointing in the direction of the first flange region 5, at least in the connected state of the body parts 9, 10, are in this case provided with toothing 12 at least sectionally.

The toothing 12 is formed at least in part or sectionally from a plastics component which is softer than the plastics component from which the first and second flange region 5, 6 are formed.

Furthermore, in the embodiments of the spacer 1 according to the invention, the base body 4 or the spacer 1, at least in the connected state of the body parts 9, 10, has a shaft region 13 connecting the first flange region 5 to the second flange region 6 and surrounding the passage 7 at least sectionally, said shaft region 13 being formed preferably from the first (harder) plastics component, and the diameter of said shaft region being smaller than the diameter of the first and second flange region 5, 6. In this case, the outer surface of the shaft region 13 delimits the gap region 11 at least sectionally in a radial direction—in respect of the longitudinal direction L of the base body 4.

Preferably, the outer surface of the shaft region 13 is formed at least sectionally from a plastics component which is softer than the plastics component from which the first and second flange region 5, 6 and the shaft region 13 of the spacer 1 are formed.

Furthermore, according to the embodiments of the spacer 1 according to the invention that are shown in the drawings, the outer surface of the shaft region 13 can be provided with toothing 12 which is formed at least in part or sectionally from a plastics component which is softer than the plastics component from which the first and second flange region 5, 6 and the shaft region 13 of the spacer 1 are formed.

Figure 7:
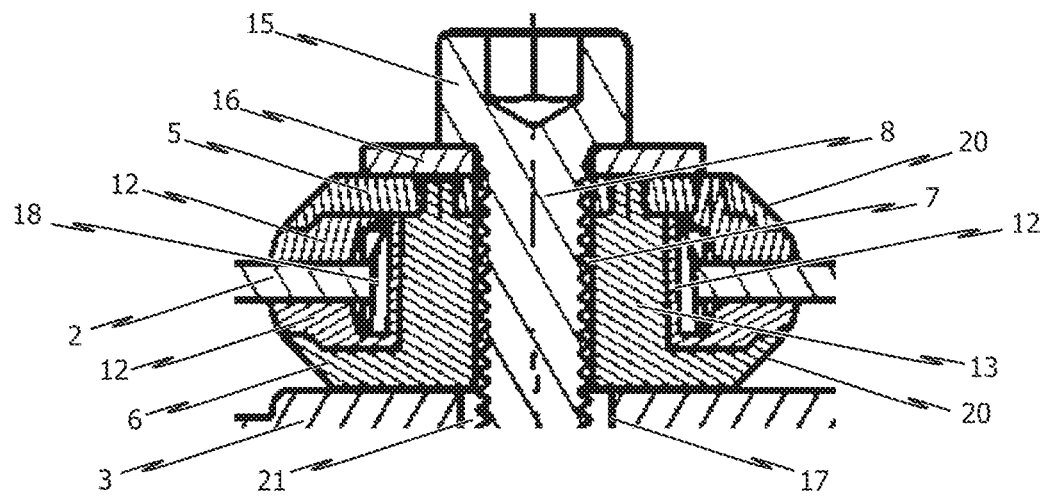
FIG. 7 schematically shows a sectional view of a fastening arrangement for the particularly vibration-damped fastening of a mounting part to a carrier part with a spacer according to the first exemplary embodiment, wherein in FIG. 7 the fastening arrangement is shown in the fully mounted state.
Figure 8:
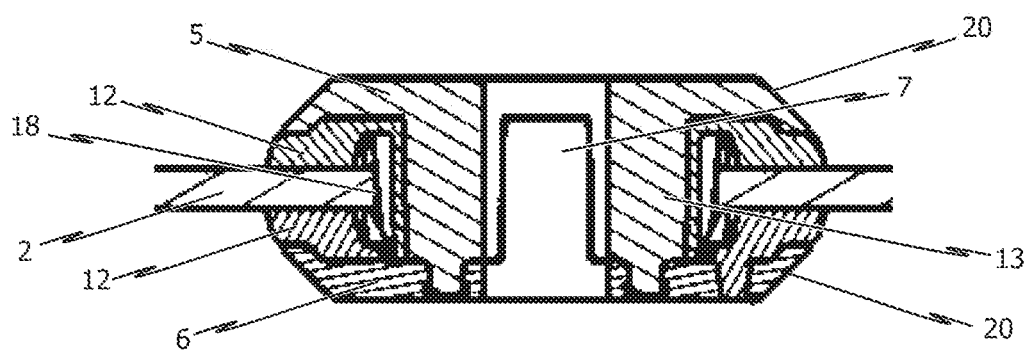
FIG. 8 schematically shows a sectional view of the spacer according to the first exemplary embodiment of the present invention in a state premounted on a mounting part.
Figure 9:
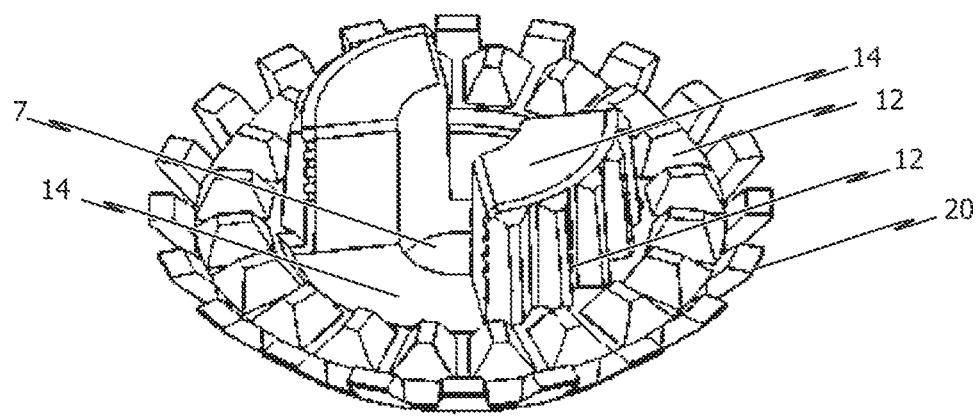
FIG. 9 schematically shows an isometric view of a body part of a base body of a spacer according to a second exemplary embodiment.
Figure 10:
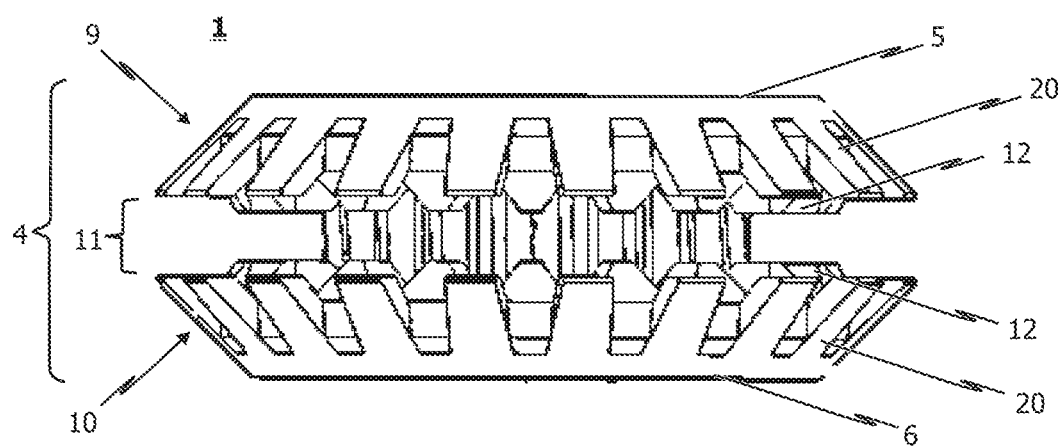
FIG. 10 shows a spacer according to the second exemplary embodiment, which comprises a base body made of two body parts according to FIG. 9 connected to one another.

A preferred embodiment of the entire fastening arrangement with a spacer 1 according to the invention is shown schematically and in a sectional view in FIG. 7. This fastening arrangement has a spacer 1 according to FIG. 8, wherein the border of a fastening hole formed in the mounting part 2 is received at least sectionally by the gap region 11 of this spacer 1.

The fastening arrangement also comprises a fastener 8, which is embodied in particular in the form of a fastening screw or mounting screw and is particularly detachably connected or connectable to the carrier part 3.

The fastener 8 has a head region 15, the diameter of which is greater than the diameter of the passage 7 running through the base body 4 of the spacer 1. The fastener 8 also has a shaft region, the diameter of which is smaller than the diameter of the passage 7 running through the base body 4 of the spacer 1. Between the head region 15 of the fastener 8 and the first flange region 5 of the spacer 1, a washer 16 can be provided.

The shaft region of the fastener 8 is received or receivable at least sectionally by the passage 7 of the spacer 1, wherein an end region of the shaft region opposite the head region 15 of the fastener 8 is connected or connectable, particularly in a force-fit and/or form-fit manner, to the carrier part 3.

As indicated in FIG. 7, it is conceivable in this connection for the fastening arrangement to comprise a fastening sleeve 21 received or receivable in an opening, in particular a bore, in the carrier part 3, by which the end region, in particular, of the shaft region of the fastener 8 is received or receivable at least sectionally in particular in a force-fit and/or form-fit manner.

LIST OF REFERENCE NUMERALS

1 Spacer
2 Mounting part
3 Carrier part
4 Base body of the spacer
5 First flange region
6 Second flange region
7 Passage
8 Fastener/mounting screw
9 First body part
10 Second body part
11 Gap region
12 Toothing
13 Shaft region
14 Plug-in connection part
15 Head region of the fastener
16 Washer
17 Opening in the carrier part 3
18 Fastening hole in the mounting part
19 Introduction slot for the fastening hole 18 in the mounting part
20 Mounting ramp of the first and second flange region
21 Fastening sleeve
L Longitudinal direction of the spacer
50 Spacer (prior art)
51 Base body of the spacer (prior art)
52 Passage bore in the base body (prior art)
54 Mounting sleeve (prior art)
55 Shaft region of the mounting sleeve (prior art)
56 Gap region in the base body (prior art)
57 Mounting screw (prior art)

What is claimed is:

1. A spacer for a fastening arrangement for vibration-damped fastening of a mounting part to a carrier part, wherein the spacer has a ring-shaped or sleeve-shaped base body with a first flange region and a second flange region which is opposite viewed in a longitudinal direction of the base body and also with a fastener passage running parallel to the longitudinal direction for receiving a fastener which is connected, or to be connected, to the carrier part, wherein the base body has an at least two-part design and comprises a first body part and at least a second body part, wherein the first and second body parts are configured to be connected to one another to create the base body and wherein, in a connected state of the first and second body parts, a substantially ring-shaped gap region is provided between the first flange region and the second flange region of the base body, wherein the substantially ring-shaped gap region is configured for receiving a border of a fastening hole configured in the mounting part, wherein at least the first and second flange regions of the base body are formed from a first plastics component and wherein a surface delimiting the substantially ring-shaped gap region is formed at least sectionally from a second plastics component which is softer by comparison with the first plastics component;
wherein the surface delimiting the substantially ring-shaped gap region includes surface portions at opposite sides of the substantially ring-shaped region, with respect to the longitudinal direction, for contacting opposite surfaces of the mounting part for damping, wherein the surface portions are formed of the second plastics component.

2. The spacer (1) according to claim 1,
wherein the first flange region has a surface pointing in the direction of the second flange region, at least in the connected state of the first and second body parts, wherein the surface is at least substantially ring-shaped, which surface delimits the gap region in the direction of the first flange region in the connected state of the first and second body parts and wherein the second flange region has a surface pointing in the direction of the first flange region, at least in the connected state of the first and second body parts, wherein the surface of the second flange region is at least substantially ring-shaped, which surface of the second flange region delimits the gap region in the direction of the second flange region in the connected state of the first and second body parts, wherein the surface of the first flange region pointing in the direction of the second flange region, at least in the connected state of the first and second body parts, and/or the surface of the second flange region pointing in the direction of the first flange region, at least in the connected state of the first and second body parts, is/are provided at least sectionally with toothing or with regions projecting correspondingly from the surface.

3. The spacer according to claim 1,
wherein the first flange region has an edge region which is bevelled at least sectionally in a direction contrary to the direction of the second flange region and has a mounting ramp; and/or
wherein the second flange region has an edge region which is bevelled at least sectionally in a direction contrary to the direction of the first flange region and has a mounting ramp.

4. The spacer according to claim 1,
wherein the base body, at least in the connected state of the first and second body parts, has a shaft region connecting the first flange region to the second flange region and surrounding the fastener passage at least sectionally, the diameter of said shaft region being smaller than the diameter of the first and second flange region.

5. The spacer according to claim 4,
wherein the outer surface of the shaft region delimits the gap region at least sectionally in a radial direction in respect of the longitudinal direction of the base body.

6. The spacer according to claim 5,
wherein the outer surface of the shaft region is formed at least sectionally from the second plastics component.

7. The spacer according to claim 6,
wherein the outer surface of the shaft region is provided with toothing or regions correspondingly projecting radially from the outer surface.

8. The spacer according to claim 1,
wherein in order to form the base body, the first and second body parts are detachably connectable to one another via a plug-in connection, wherein the first body part comprises at least one first plug-in connection part configured as a receiving plug-in part or a plug-in part to be received and the at least one second body part comprises at least one second plug-in connection part designed accordingly in a complementary manner thereto.

9. A fastening arrangement for vibration-damped fastening of a mounting part to a carrier part, wherein the fastening arrangement comprises the following:
the spacer according to claim 1, wherein the border of the fastening hole formed in the mounting is received at least sectionally by the substantially ring-shaped gap region of the spacer; and
the fastener, in the form of a fastening screw, is detachably connected to the carrier part,
wherein the fastener has a head region, a diameter of which is greater than a diameter of the fastener passage running through the base body of the spacer, and a shaft region, a diameter of which is smaller than a diameter of the fastener passage running through the base body of the spacer, wherein the shaft region of the fastener is received at least sectionally by the fastener passage and wherein an end region of the shaft region opposite the head region of the fastener is connected, in a force-fit and/or form-fit manner, to the carrier part.

10. The fastening arrangement according to claim 9,
wherein the fastening arrangement further comprises a fastening sleeve received or receivable in an opening in the carrier part, by which the end region of the shaft region of the fastener is received or receivable at least sectionally in a force-fit and/or form-fit manner.

11. A method for the vibration-damped fastening of a mounting part to a carrier part, wherein the method comprises the following method steps:
provision of a fastening arrangement according to claim 9;
formation of the fastening hole in the mounting part, wherein the border of the fastening hole comprises a continuous, uninterrupted border;
mounting of the spacer of the fastening arrangement on the mounting part, wherein the first body part of the base body of the spacer is placed on the fastening hole from a first side and the second body part of the base body of the spacer is placed on the fastening hole from a second side and the first and second body parts are subsequently connected to one another in such a manner that a shaft region connecting the first and second flange region of the spacer runs through the fastening hole; and
connection of the fastener running at least sectionally through the fastener passage of the spacer to the carrier part.

12. A spacer for a fastening arrangement for vibration-damped fastening of a mounting part to a carrier part, wherein the spacer has a ring-shaped or sleeve-shaped base body with a first flange region and a second flange region which is opposite viewed in a longitudinal direction of the base body and also with a fastener passage running parallel to the longitudinal direction for receiving a fastener which is connected, or to be connected, to the carrier part, wherein the base body has an at least two-part design and comprises a first body part and a second body part, wherein the first and second body parts are configured to be connected to one another to create the base body and wherein, in a connected state of the first and second body parts, a substantially ring-shaped gap region is provided between the first flange region and the second flange region of the base body, wherein the substantially ring-shaped gap region is configured for receiving a border of a fastening hole configured in the mounting part;
wherein the first flange region is formed at least sectionally from a first plastics component and has an edge region which is bevelled at least sectionally in a direction contrary to the direction of the second flange region and has a mounting ramp; and
wherein the first flange region and/or the edge region of the first flange region are/is formed from the first plastics component and have/has a shape which is selected in such a manner that a second plastics component, which is softer by comparison with the first plastics component and provided in or at the gap region, is screened from direct contact with the carrier part by the first flange region and/or its edge region.

13. A spacer for a fastening arrangement for vibration-damped fastening of a mounting part to a carrier part, wherein the spacer has a ring-shaped or sleeve-shaped base body with a first flange region and a second flange region which is opposite viewed in a longitudinal direction of the base body and also with a fastener passage running parallel to the longitudinal direction for receiving a fastener which is connected, or to be connected, to the carrier part, wherein the base body has an at least two-part design and comprises a first body part and at least a second body part, wherein the first and second body parts are configured to be connected to one another to create the base body and wherein, in a connected state of the first and second body parts, a substantially ring-shaped gap region is provided between the first flange region and the second flange region of the base body, wherein the substantially ring-shaped gap region is configured for receiving a border of a fastening hole configured in the mounting part, wherein at least the first and second flange regions of the base body are formed from a first plastics component and wherein a surface delimiting the substantially ring-shaped gap region is formed at least sectionally from a second plastics component which is softer by comparison with the first plastics component;

wherein the first flange region has a surface pointing in the direction of the second flange region, at least in the connected state of the first and second body parts, wherein the surface is at least substantially ring-shaped, which surface delimits the gap region in the direction of the first flange region in the connected state of the first and second body parts and wherein the second flange region has a surface pointing in the direction of the first flange region, at least in the connected state of the first and second body parts, wherein the surface of the second flange region is at least substantially ring-shaped, which surface of the second flange region delimits the gap region in the direction of the second flange region in the connected state of the first and second body parts, wherein the surface of the first flange region pointing in the direction of the second flange region, at least in the connected state of the first and second body parts, and/or the surface of the second flange region pointing in the direction of the first flange region, at least in the connected state of the first and second body parts, is/are provided at least sectionally with toothing or with regions projecting correspondingly from the surface;

wherein the toothing or the correspondingly projecting regions is/are formed at least in part or sectionally from the second plastics component.

14. A spacer for a fastening arrangement for vibration-damped fastening of a mounting part to a carrier part, wherein the spacer has a ring-shaped or sleeve-shaped base body with a first flange region and a second flange region which is opposite viewed in a longitudinal direction of the base body and also with a fastener passage running parallel to the longitudinal direction for receiving a fastener which is connected, or to be connected, to the carrier part, wherein the base body has an at least two-part design and comprises a first body part and at least a second body part, wherein the first and second body parts are configured to be connected to one another to create the base body and wherein, in a connected state of the first and second body parts, a substantially ring-shaped gap region is provided between the first flange region and the second flange region of the base body, wherein the substantially ring-shaped gap region is configured for receiving a border of a fastening hole configured in the mounting part, wherein the first body part includes a shaft region and the second body part includes a shaft region, wherein, in the connected state of the first and second body parts, the shaft region of the first body part overlaps in the longitudinal direction with the shaft region of the second body part for connecting the first and second body parts together;

wherein at least the first and second flange regions of the base body are formed from a first plastics component, wherein a surface delimiting the substantially ring-shaped gap region includes surface portions at opposite sides of the substantially ring-shaped region, with respect to the longitudinal direction, for contacting opposite surfaces of the mounting part for damping, wherein the surface portions are formed of a second plastics component that is softer than the first plastics component.

* * * * *